United States Patent [19]
Kakii et al.

[11] Patent Number: 4,950,048
[45] Date of Patent: Aug. 21, 1990

[54] OPTICAL CONNECTOR FERRULE

[75] Inventors: Toshiaki Kakii; Yasuo Asano; Shuzo Suzuki; Koji Kashihara; Kazuhito Saito; Takeo Komiya, all of Kanagawa, Japan

[73] Assignee: Sumitomo Electric Industries, Ltd., Osaka, Japan

[21] Appl. No.: 60,615

[22] Filed: Jun. 11, 1987

[30] Foreign Application Priority Data

Jun. 13, 1986 [JP] Japan ................................ 61-138671
Apr. 1, 1987 [JP] Japan ................................ 62-81767

[51] Int. Cl.⁵ ............................ G02B 6/36; G02B 7/26
[52] U.S. Cl. ............................ 350/96.20; 350/96.22; 350/96.23
[58] Field of Search ............... 350/96.20, 96.22, 96.23

[56] References Cited
U.S. PATENT DOCUMENTS 4,123,137 10/1978 Marcatili ......................... 350/96.22
4,142,776 3/1979 Cherin et al. .................... 350/96.21
4,475,790 10/1984 Little .............................. 350/96.21

Primary Examiner—William L. Sikes
Assistant Examiner—Robert E. Wise
Attorney, Agent, or Firm—Cushman, Darby & Cushman

[57] ABSTRACT

An optical connector ferrule for use in an optical coupling of optical fibers includes an insertion member, the insertion member comprising a guide capillary for positioning said optical fibers, which comprises a flat plate and a guide substrate having optical fiber guide grooves in one surface thereof, said flat plate being bounded to said guide substrate to form optical fiber guide holes into which said optical fibers are inserted; a reinforcing pipe for surrounding said guid capillary; and a resin-molded area provided between said guide capillary and said reinforcing pipe for insert-molding said guide capillary within said reinforcing pipe.

18 Claims, 8 Drawing Sheets

OPTICAL CONNECTOR FERRULE

CROSS REFERENCE TO THE RELATED APPLICATION

The present application is related to U.S. patent application Ser. No. 07/025,840 filed Mar. 13, 1987, now U.S. Pat. No. 4,818,059.

BACKGROUND OF THE INVENTION

1. Field of the Invention

The present invention relates to an optical connector ferrule that allows multiple optical fibers to be coupled precisely when connecting or switching operation is performed on lightwave communication systems.

2. Prior Art

Figure 1A:
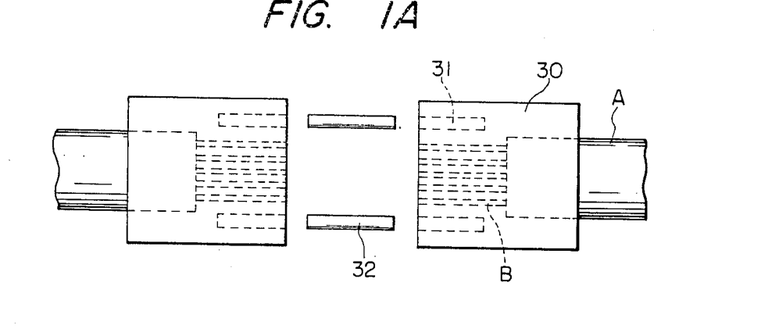
FIG. 1A is a top view and FIG. 1B is a front view of a connector end.
Figure 1B:
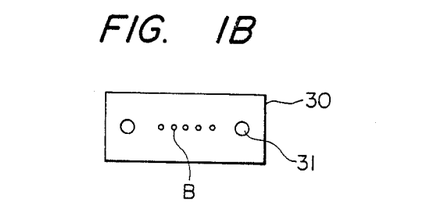

FIGS. 1A and 1B are schematic drawings of a prior art (5-count) optical connector ferrule, in which FIG. 1A is a top view and FIG. 1B is a front view of the coupling end of the connector shown in FIG. 1A.

As shown in the figures, two guide pin holes 31 are formed in a resin-molded member 30. The optical fibers (B) in a multi-fiber array (A) are aligned on the line connecting the centers of the axes of the guide pin holes 31 and are coupled to the optical fibers in another connector by inserting two guide pins 32 into the corresponding guide pin holes 31 in each connector. The guide pins 31 are spaced from each other at a pitch of 3,600 mm and the optical fibers (B) are spaced at a pitch of 0.250 mm.

The above-described prior art optical connector ferrules require two guide pins for achieving their coupling and they cannot be handled as conveniently as electrical connectors which can be coupled by simply inserting plugs into a common adapter. In order to couple the conventional optical connector ferrules, careful and cautious procedures must be followed using guide pins. A further problem arises from the fact that there is no consistency in the presence of guide pins in the optical connector ferrules after they are dismounted, and every time they are to be reconnected, the operator must check to see if they retain guide pins and, if not, the necessary guide pins are furnished. This problem may be solved by permanently embedding guide pins in several optical connector ferrules but this idea has not been commercialized since it involves many disadvantages associated with practical applications, such as the incapability of coupling two connector ferrules both having permanently fixed guide pins. The difficulty involved in handling guide pins is further increased by the fact that they have a very small diameter 0.7 mm.

Further, the guide pin holes which are formed by resin molding are prone to wear or be damaged when guide pins are inserted into these holes, and great difficulty is encountered in realizing high-precision and reliable coupling of optical fibers.

It becomes more difficult to achieve precise coupling, and keeping the amount of offsetting to be within 1-2 $\mu$m involves extreme difficulty in view of production efficiency, as the number of optical fibers to be connected increases since the multiple fibers are molded in one operation. The optical fiber guide holes are also formed with molding pins placed in alignment in the mold and this increases the change of the molding pins being deformed either under the molding pressure or during their setting in the mold.

SUMMARY OF THE INVENTION

An object of the invention is to provide an optical connector ferrule that has solved the aforementioned problems by eliminating the use of guide pins.

Another object of the invention is to provide an optical connector ferrule having an insertion member which includes a reinforcing pipe on the outer periphery thereof and a guide capillary in the interior thereof and a resin-molded area provided between the reforcing pipe and the guide capillary, the guide capillary being resin-molded together with the reinforcing pipe to form a unitary member.

A further object of the present invention is to provide an optical connector ferrule having a insertion member in which a flange having non-circular cross-sectional shape is provided in the rear portion of the ferrule so that two units of optical connector ferrule can be coupled together with them being aligned with respect to the rotational direction thereof.

A still further object of the present invention is to provide an optical connector ferrule having a plurality of insertion members which are connected together by a linking section so that the insertion members are connected and fixed in a unitary form.

BRIEF DESCRIPTION OF THE DRAWINGS

FIGS. 1A and 1B are schematic drawings showing a conventional optical connector ferrule, in which

FIGS. 2A and 2B are schematic drawings of a guide capillary used in the embodiments of the invention, in which

FIGS. 4A, 4B, 4C, 4D, and 4E are schematic drawings showing an optical connector ferrule with a flange according to one embodiment of the invention, in which

FIGS. 5A and 5B are schematic drawings showing one example of an optical connector plug and an optical connector adapter used in the invention, in which

FIGS. 9A and 9B are schematic drawings showing an optical connector ferrule of the invention in which

DESCRIPTION OF THE PREFERRED EMBODIMENTS

Figure 2A:
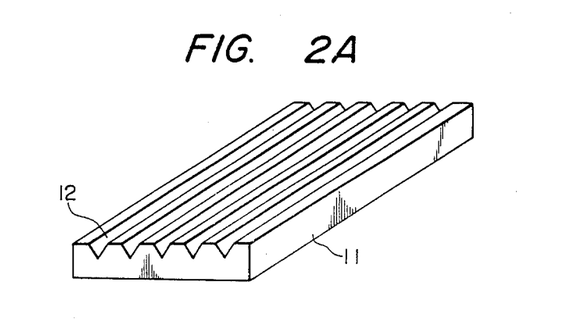
FIG. 2A is a perspective view of a guide substrate.
Figure 2B:
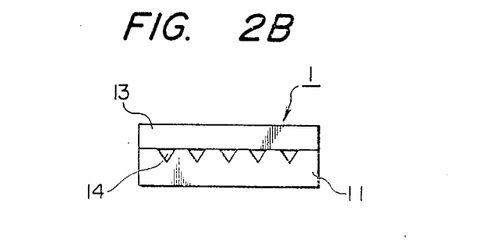
FIG. 2B is a front view of a capillary end.

FIGS. 2A and 2B are schematic drawings showing a guide capillary having optical fiber guide holes that help optical fibers to be fixed in alignment in the optical connector ferrule of the present invention.

As shown in FIG. 2A, a guide substrate 11 has V-shaped optical fiber guide grooves in the top surfaces thereof and a flat plate 13 is bonded by a thin adhesive layer to the substrate so as to form a guide capillary 1 which, as shown in FIG. 2B, has triangular optical fiber guide holes 14 in the interior thereof.

Each of the guide substrate 11 and the flat plate 13 may be formed of silicon or a ceramic such as glass or alumina. If they are formed of a plastic that has a smaller Young's modulus than the optical fiber glass, they are possessed of sufficient deformability to ensure that desired optical contact is readily attained.

In order to attain high dimensional accuracy, the flat plate 13 is preferably bonded to the guide substrate 11 with a thin adhesive film $\leq 1$ $\mu$m being interposed by spin coating.

Figure 3:
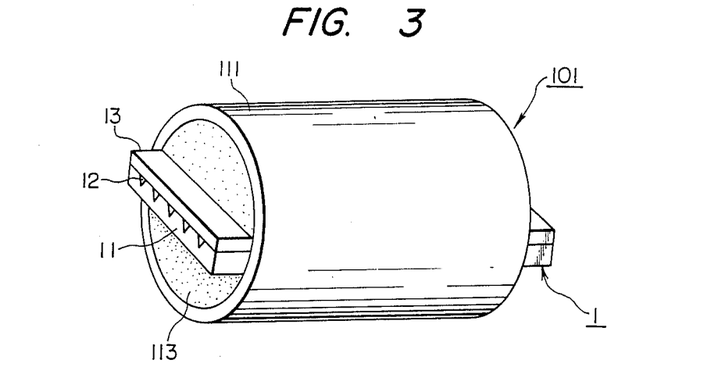
FIG. 3 is a general view showing an insertion member according to the embodiments of the invention.

FIG. 3 is a principal drawing showing an insertion member which is provided in the optical connector ferrule of the present invention. In FIG. 3, an insertion member 101 is constituted of a reinforcing pipe 111 which is made of a suitable material such as a ceramic or metal and a guide capillary 1 positioned for being molded in a resin-molded area 113 together with the reinforcing pipe 111 to form a unitary member.

FIGS. 4A through 4E illustrate an optical connector ferrule according to one embodiment of the present invention. As shown in the drawings, a guide capillary 1 having optical fiber guide holes therein is insert-molded within a reinforcing pipe 111, with a resin-molded area 113 filled between the capillary and the pipe. In the rear portion of the ferrule are provided a flange 105 and a resin-molded rear portion 104, which may be formed either simultaneously with the insert-molding of the capillary 1 or by two-stage molding. In the interior of the flange 105 and the resin-molded rear portion 104, an optical fiber array fixing area 106 is formed that communicates with optical fiber guide holes 14 in the capitally 1.

Figure 4A:
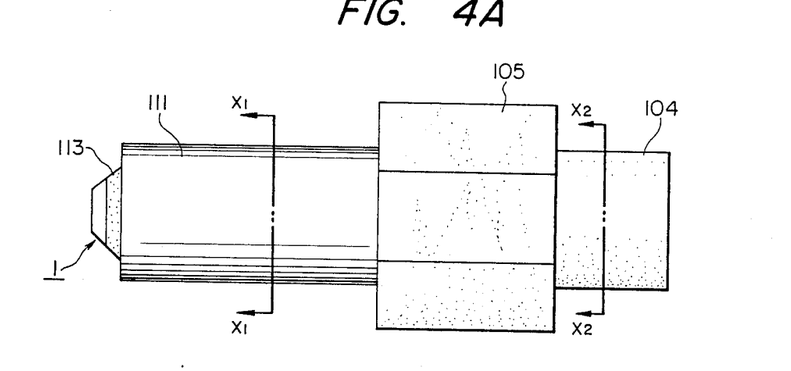
FIG. 4A is a general side view.
Figure 4B:
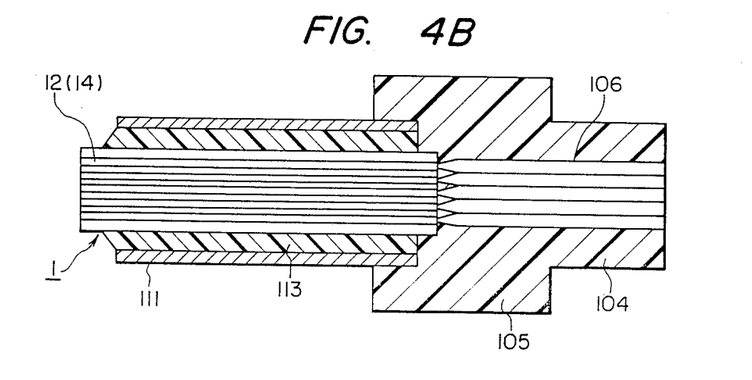
FIG. 4B is a longitudinal section.
Figure 4C:
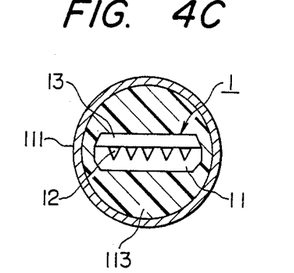
FIG. 4C is a cross section of FIG. 4A taken on line $X_1$-$X_1$.
Figure 4D:
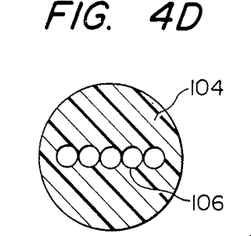
FIG. 4D is a cross section of FIG. 4A taken on line $X_2$-$X_2$.

The reinforcing 111 may be made of stainless steel or a ceramic. In order to ensure strong bond to the resin-molded area 113, the inner periphery of the reinforcing pipe 111 may be embossed. A thermosetting epoxy resin is typically used as the molding resin but if the specific object of use permits, a thermoplastic resin may be employed.

The mold used for insert molding must be designed in such a manner that the guide capillary 1 makes a predetermined angle with a reference member such as, for example, the flange 105. If a higher dimensional accuracy is desired, the outer peripheral surface of the reinforcing pipe 111 may be ground with the center of machining being fixed at the optical fiber guide hole 14 that is situated at the center of the pipe 111.

The optical fiber array fixing area 106 is formed by molding with core pins corresponding to this area being inserted in the mold. After molding, the core pins are withdrawn.

Figure 4E:
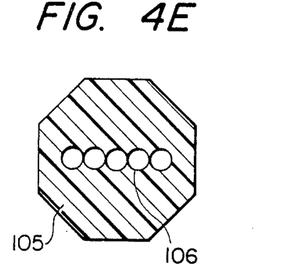
FIG. 4E is a sectional view showing the profile of the flange portion of the ferrule.

Two units of the optical connector ferrule having the construction described above can be coupled together by being inserted into a sleeve. As already mentioned, the guide capillary 1 must be properly positioned with respect to the rotational direction of the ferrule. To this end, the flange 105 has a non-circular, say, octagonal, cross section. Since the guide capillary 1 has been molded so that it has a predetermined relative position with respect to the flange 105, two units of optical connector ferrule can be coupled together with them being aligned with respect to the rotational direction by providing matching between the flanges of the two units in terms of the angle at which they are positioned in the sleeve.

Figure 5A:
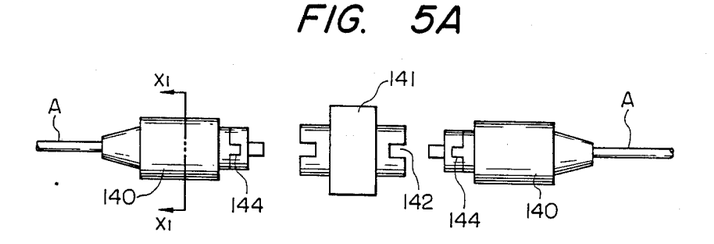
FIG. 5A is a longitudinally section side view and FIG. 5B is a section of FIG. 5A taken on line $X_1$-$X_1$.
Figure 5B:
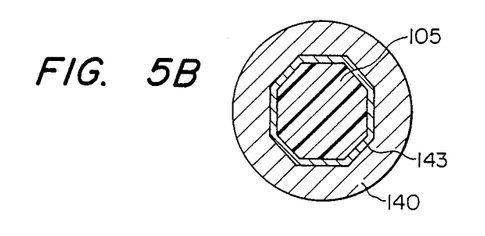

Concretely, as shown in FIGS. 5A and 5B an optical connector plug housing 140 is provided that has an octagonal recessed area 143 for receiving the octagonal flange 105 of the ferrule, and an adapter 141 is provided that has a groove 142 engaging the finger 144 on each plug so as to allow coupling with the latter at a predetermined angle. As a result, the operator has only to insert the plugs 140 into the adaptor 141 from opposite sides for the purpose of achieving aligned coupling of the two units of optical connector ferrule.

The flange 105 shown in FIG. 4E has an octagonal cross section but this is not the only form that can be taken by the flange 105 and it may assume any other non-circular cross-sectional shape.

Figure 17A:
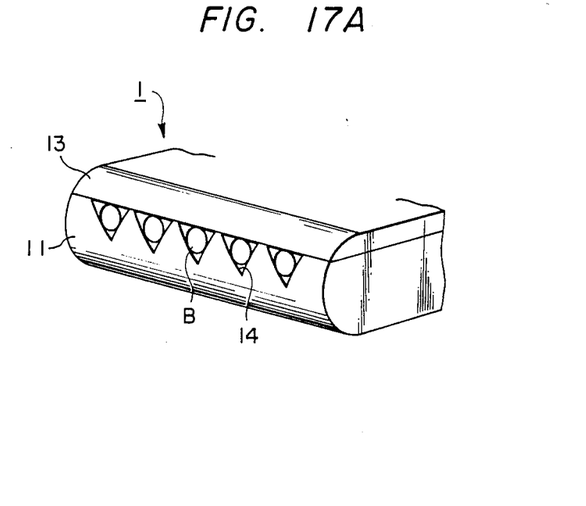
FIGS. 17A and 17B are general views showing the front end of the guide capillary.
Figure 17B:
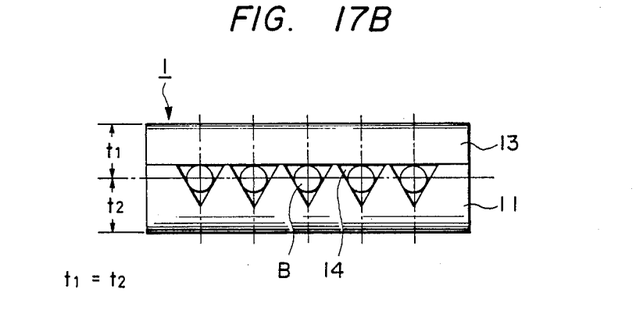

In order to provide ease in the grinding and polishing of the coupling end of the optical connector ferrule of the present invention, the front end of the guide capillary 1 projects beyond the front end of the reinforcing pipe 111 and the projecting end of the capillary is tapered so that the coupling end of the ferrule can be easily ground and polished to provide a cylindrical surface profile with the center of the optical fibers as shown in FIG. 17A. At this time, as shown in FIG. 17B, the thickness $t_1$ of the guide capillary is set to be substantially equal to the thickness $t_2$ thereof, so that the center of the optical fibers is arranged on the top of the cylindrical surface. As a result, effective optical contact of two optical fibers is obtained. This allows two optical fibers to be brought into optical contact with no interposing air layer present and the resulting coupling loss can be decreased by approximately 0.3 dB which is equivalent to the Fresnel loss.

Figure 6:
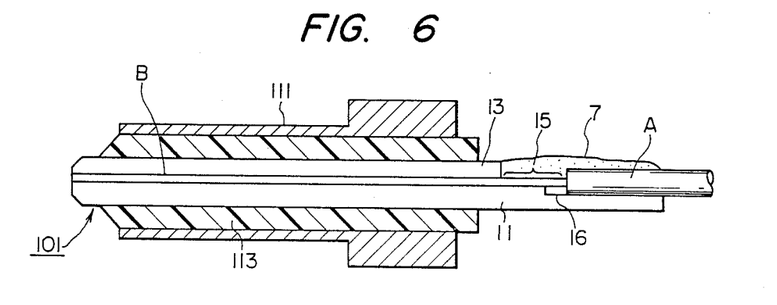
FIGS. 6 and 7 are schematic drawings showing optical connector ferrules with a flange according to the embodiments of the invention.

FIG. 6 is a longitudinally sectioned side view showing another embodiment of the optical connector ferrule of the present invention. In this embodiment, the reinforcing pipe and the flange of the ferrule are made in a unitary form that is composed of a metal (e.g. stainless steel pipe 111). The guide capillary 1 is insert-molded within this metal pipe 111, with a resin-molded area 113 being formed between the capillary and the pipe.

As shown in FIG. 6, the rear end of the guide capillary 1 projects beyond the rear end of the guide ferrule and the guide substrate 11 of the capillary 1 is formed longer than the overlying flat plate 13, thereby allowing part of the optical fiber guide grooves 12 to be exposed in the excess portion 15 of the substrate which combines with a step 16 to form a fiber array fixing area. This arrangement facilitates insertion of the optical fibers (B) into their respective guide holes 14. In FIG. 6, the optical fibers (B) and the coated fibers (A) are secured in position by an adhesive layer 7.

Figure 7:
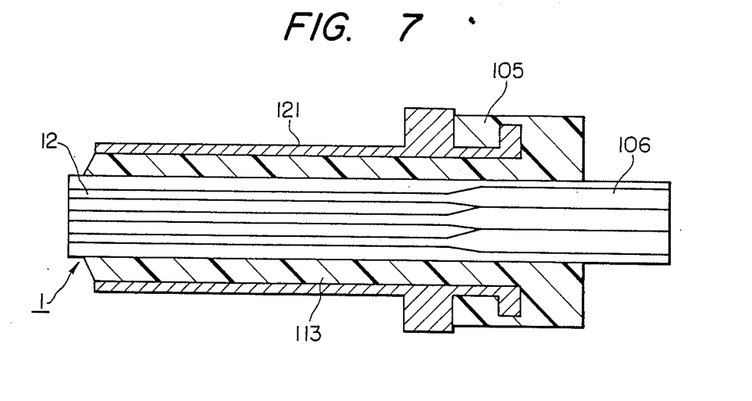

FIG. 7 is a longitudinal section of still another embodiment of the optical connector ferrule of the present invention that is taken parallel to the optical fiber guide holes. In this embodiment, a flange 105 is formed by the combination of resin molding and a metal member 121 that is integral with the reinforcing pipe as in the embodiment shown in FIG. 6. The inner surface of the metal member 121 is embossed in order to ensure strong bond to the resin-molded area. A fiber array fixing area 106 continuous to the optical fiber guide grooves 12 is formed in the guide capillary 1.

EXAMPLE

An optical connector ferrule having the construction shown in FIG. 7 was fabricated. The guide capillary was composed of an all-silicon guide substrate and flat plate. The ferrule was adapted to accommodate three coated optical fibers, and fiber guide holes were so formed that they would allow the optical fibers to be spaced from each other at a pitch of 0.30 mm. Holes in which the coated optical fibers were to be fixed were also formed in the guide capillary in such a manner that the former holes would communicate with the latter holes. The coated optical fiber fixing holes had a diameter of 0.27 mm and a depth of 3 mm.

The reinforcing pipe was made of stainless steel and had an octagonal flange as an integral part thereof. The inner surface of the rear portion of the pipe in the flange was embossed. The guide capillary was positioned and insert-molded within the reinforcing pipe. After molding, the outer peripheral surface of the reinforcing pipe was ground with the center fiber guide hole being used as the center of machining. The resulting optical connector ferrule having the construction shown in FIG. 7 had a diameter of 2.499 mm in the reinforcing pipe portion and its overall length was 14 mm.

Optical fibers were inserted into two units of such connector ferrule, secured with an adhesive, and had their ends ground and polished to provide a cylindrical surface profile. The ferrules were then accommodated in connector plugs that were capable of precise positioning of the octagonal flange. The plugs were then inserted into an appropriate connector adapter from opposite sides and coupling loss measurement was conducted. The optical fibers were multi-mode fibers each having an outside diameter of 125 $\mu$m and a core diameter of 50 $\mu$m and their average coupling loss was 0.12 dB. The ends of the ferrules may be ground and polished to provide a surface flat that is perpendicular to the fiber axis; when two ferrules were coupled together, in the pressure of an index-matching medium, with their ends perpendicular to the fiber axis, the average coupling loss was 0.08 dB.

In order to evaluate the reliability of the ferrules, they were subjected to 500 cycles of connect/disconnect test and a heat cycle test ranging from $-30°$ C. to $+70°$ C. In each of the tests conducted, the variation in the coupling loss was within the range of $\pm 0.05$ dB which was well satisfactory for practical purposes.

Figure 8A:
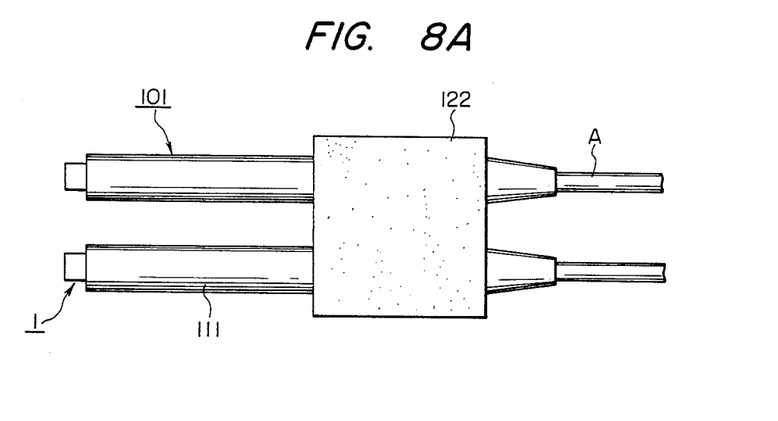
FIGS. 8A and 8B are general views showing an optical connector ferrule with a resin-molded linking section according to another embodiment of the invention.
Figure 8B:
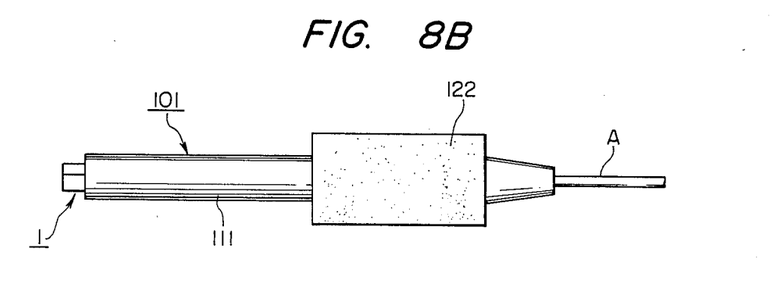

Further, FIGS. 8A and 8B illustrate an optical connector ferrule according to a still further embodiment of the present invention. In FIGS. 8A and 8B, an insertion member 101 has a reinforcing pipe 111 on its periphery (the pipe being made of a suitable material such as a metal or ceramic) and a guide capillary 1 in its interior which is resin-molded together with the reinforcing pipe to form a unitary member; and a resin-molded linking section 122 is so formed that a plurality of insertion members 101 are connected and fixed in a unitary form.

Figure 9A:
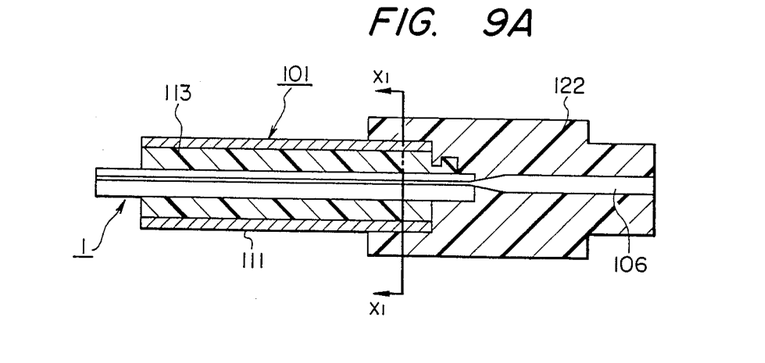
FIG. 9A is a longitudinally section side view.
Figure 9B:
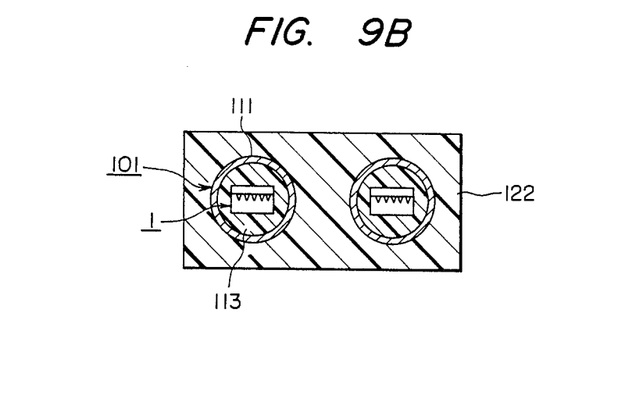
FIG. 9B is a section of FIG. 9A taken on line $X_1$-$X_1$.

In the embodiment shown in FIGS. 9A and 9B, the front end of the guide capillary 1 projects beyond an end of the reinforcing pipe 111 and a fiber array fixing area 106 for fixing arrays of coated optical fibers (A) is formed within the resin-molded linking section 122.

Figure 10:
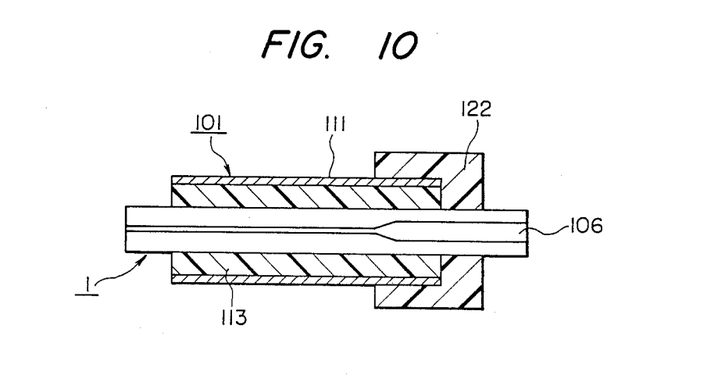
FIGS. 10 and 11 are longitudinally sectional side views showing an optical connector ferrule with a resin-molded linking section according to two other embodiments of the invention.

Further, in the embodiment shown in FIG. 10, the front end of the guide capillary 1 projects beyond an end of the reinforcing pipe 111 and the fiber array fixing area 106 is provided within the guide capillary 1. In the embodiment shown in FIG. 11, the front end of the guide capillary 1 is flush with an end of the reinforcing pipe 111 and the fiber array fixing area 106 is provided within the guide capillary 1.

Figure 12A:
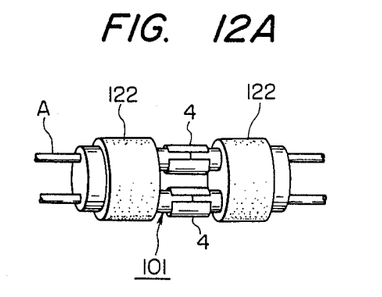
FIGS. 12A, 12B and 13 are schematic drawings showing coupling two units of optical connector ferrule of the invention.
Figure 12B:
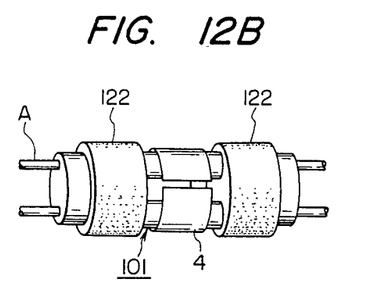
Figure 13:
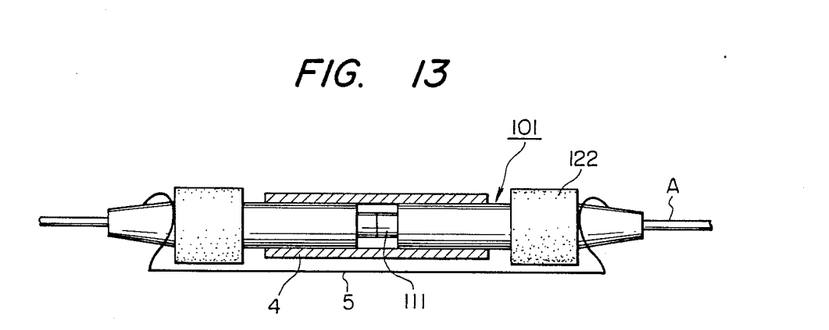

A plurality of the so fabricated insertion members 101 are connected together by the linking section 122 formed by a technique such as resin molding, in which they are fixed and integrated to provide the optical connector ferrule depicted in FIGS. 8A and 8B. FIG. 13 is a view of two optical connector ferrules of the present invention in the coupled state. In FIG. 13, a coupling sleeve 4 is provided. Sleeves 4 as many as the insertion members 101 in each of the two connector ferrules are provided as shown in FIG. 12A, and two insertion members 101 to be connected end to end are inserted into each sleeve 4, with the coupling to two connector ferrules being secured by a resilent clip 5 that presses the rear end of the linking section 122 of each ferrule. One sleeve 4 may be provided for holding all the insertion members provided in each ferrule, as shown in FIG. 12B.

The above is just one example of the method for coupling connector ferrules. If desired, the required number of sleeves may be accommodated as a unit in a single adaptor housing. Needless to say, two optical connector ferrules may be accommodated in a plug housing in which they are connected by a built-in spring and secured by a screw or some other fastening device as in the case of the coupling of conventional single-fiber optical connectors. What are important for the present invention are: two optical connector ferrules can be coupled together without employing any guide pin; and a guide capillary is insert-molded within the insertion member so as to provide a large number of optical fiber guide holes.

EXAMPLE

The optical connector ferrule of the present invention may be fabricated by the following procedures. First, a guide capillary 12 of the type shown in FIG. 2B is made. V-grooves can be made in the top surface of a guide substrate 11 by a suitable technique such as lithoetching on a silicon wafer or cutting with a diamond wheel. The latter method is particularly advantageous for the following two specific reasons: equilateral V-grooves can be formed by employing a wheel whose blade has an edge of 60°; in subsequent grinding of the peripheral surface of a reinforcing pipe with the center guide hole being used as a reference for the center of machining, forces will act evenly on the three points of a rectangle so as to ensure consistent machining. In the experimental fabrication conducted by the present inventors, V-grooves 12 were continuously cut on a 5- inch silicon wafer with a diamond wheel and the resulting grooved surface was bonded to a flat plate with an interposing thin adhesive film to form a unitary member. The assembly was then cut into chips of a predetermined length, thereby making discrete capillaries 1 of the shape shown in FIG. 2B.

The guide substrate 11 is preferably made of silicon or any other hard and brittle material such as ceramic and quartz glass and this has the advantage of producing high-precision V-grooves without burrs.

In the experimental fabrication, each of guide capillaries 1 had V-shaped fiber guide grooves 12 that were so formed as to receive optical fibers that were spaced at a pitch of 0.25 mm and which had a diameter of 125 μm.

Figure 14:
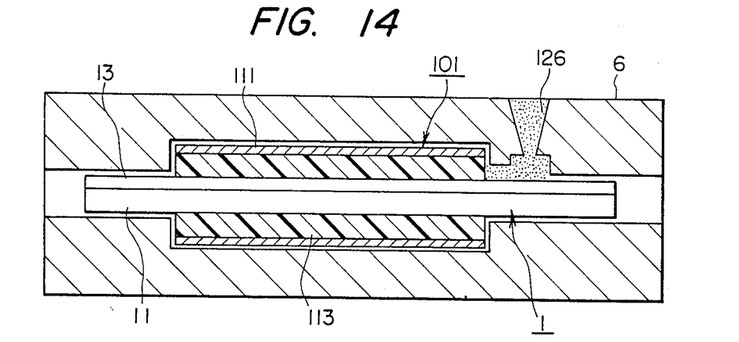
FIG. 14 is a longitudinal section of a mold used in molding an insertion member.

In the next step, each of the guide capillaries 1 is positioned within a reinforcing pipe 111 and set in a mold 6 as shown in FIG. 14. A molten resin is injected into the cavity 126 of the mold so as to effect insert molding in which the reinforcing pipe 111 is integrated with the guide capillary 1 by means of a resin-molded area 113 so as to form an insertion member 101 of the shape depicted in FIG. 3. In order to ensure a high bond strength, a stainless steel pipe having a threaded inner surface was used as the reinforcing pipe 111 in the experimental fabrication.

Because of the nature of the machining method employed, the pitch and depth of the V-grooves 12 formed in the guide capillary 1 have high levels of precision. However, when the capillary 1 is resin-molded for integration with the reinforcing pipe 111, the center of the latter will not necessarily match the center one of the V-grooves 12. In order to avoid this mismatching, the relative positions of the reinforcing pipe 111 and the V-grooves 12 are indexed in a precise manner by grinding the peripheral surface of the reinforcing pipe 111 with the center V-groove used as a reference for the center of machining. Since the accuracy of the V-grooves 12 in terms of their dimensions and pitch has already been attained by the preceding machining on the guide substrate 11, all of the V-grooves can be simultaneously indexed by grinding the peripheral surface of the reinforcing pipe 111 with matching attained between the center V-groove and the center of the pipe 111. It is convenient to use one of the optical fiber guide grooves as the center V-groove but if there is no optical fiber guide groove that can be used as the center V-groove, a separate positioning V-groove may be formed in the guide capillary 1 beforehand so that it can be used as the center V-groove.

Figure 11:
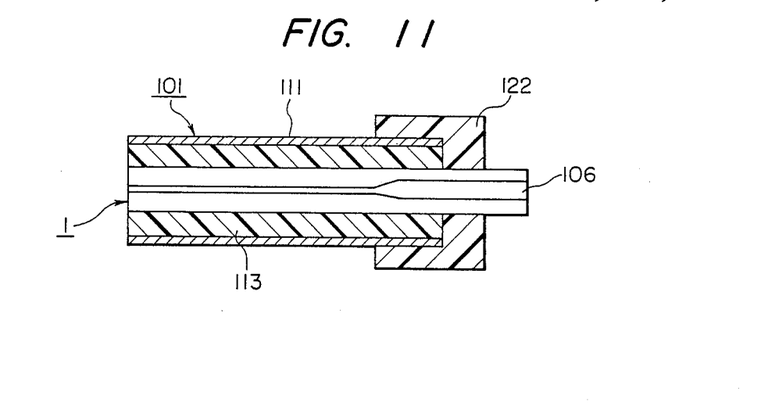
Figure 15:
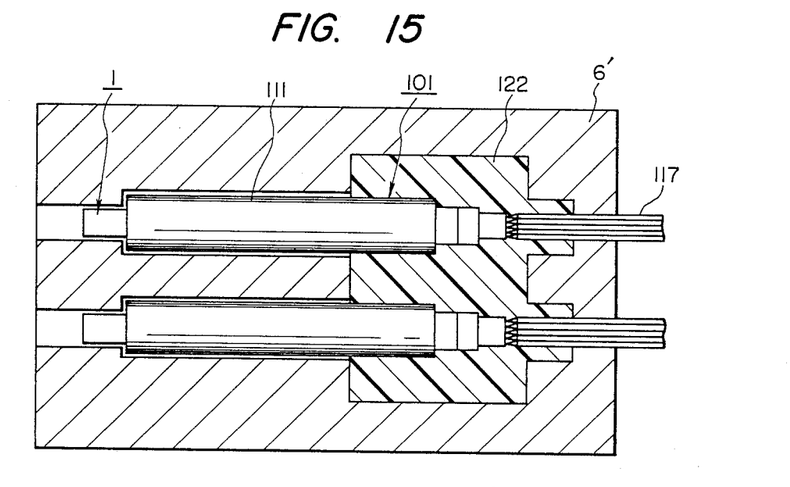
FIG. 15 is a longitudinal section of a mold used in molding a resin-molded linking section.

Then, as shown in FIG. 15, with the front face of the guide capillary 1 which projects beyond the reinforcing pipe 111 being used as a reference, a plurality of insertion members 101 are set in a mold 6' with proper positioning attained in the rotational direction of ferrule. Thereafter, resin molding is performed to make a linking section 122 in which the insertion members 101 are fixed in a unitary form. If this resin molding is effected with molding pins 117 being inserted into V-grooves 12, a fiber array fixing area 106 for fixing arrays of coated optical fibers (A) can be formed within the linking section 122 simultaneously with the formation of the latter. Alternatively, the fiber array fixing area 106 can be formed by using a drill or some other boring device to directly make a hole for the fixing area 106 in the interior of the guide capillary 1 as shown in FIGS. 10 and 11.

Subsequently, arrays of coated optical fibers are fixed in the resulting connector ferrule and the fiber ends are ground and polished. Thereafter, two of the so processed ferrules are coupled together by means of a sleeve 4 and secured in position with a clamp 5 as shown in FIG. 13. This is just one example of the method for establishing the connection of two ferrules. If desired, the optical connector ferrule of the present invention may be accommodated in a plug housing for use as an optical connector that can be readily connected or dismounted. For the ease of handling, it is preferable to accommodate a plurality of sleeves as a unit within a single adapter.

Figure 16A:
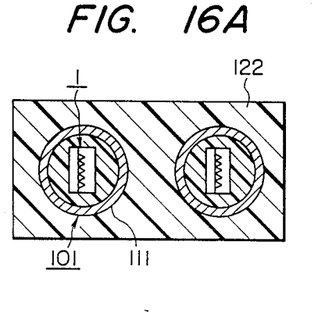
FIGS. 16A and 16B are cross sections showing two modified structures of an optical connector ferrule with a resin-molded linking section according to the invention.
Figure 16B:
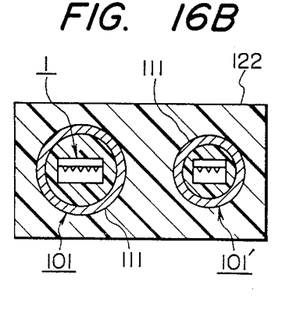

As shown in FIGS. 16A and 16B, the optical fiber guide holes in the guide capillary 1 may be arranged in a direction that is perpendicular or parallel to the direction in which the insertion members 101 are arranged and this provides convenience for achieving correct positioning in the mold. Further, one of the two insertion members may be designed to have a smaller diameter than the other insertion member as indicated by an insertion member 101' in FIG. 16B, and this difference in diameter can be used to determine the proper orientation of ferrule coupling or to distinguish between two directions of coupling orientation.

In the embodiments described above, two insertion members 101 are provided in one connector ferrule but, needless to say, three or more insertion members 101 may be provided.

In the experimental fabrication, two insertion members each accommodating five coated optical fibers were employed to make a 10-fiber optical connector ferrule. Each insertion member had an outside diameter of 2.499 mm and a length of 7 mm. Two units of such connector ferrule were coupled together and the resulting coupling loss was measured on single-mode fibers (core diameter, 10 μm; outside diameter, 125 μm) that had a coating with an outer diameter of 0.25 mm. The results were 0.27 dB on average and 0.63 dB at maximum, showing the very low-loss nature of the optical connector ferrule fabricated in accordance with the present invention. In addition, the connection and disconnection of ferrules can be accomplished with high efficiency because of the absence of the need to use guide pins. The coupling loss occurring in the ferrules is highly stable as evidenced by the variation with the range of ±0.1 dB that occurred after 500 cycles of a connect/disconnect test. As a further advantage, if each of the V-shaped optical fiber guide grooves is in the form of an equilateral triangle, the peripheral surface of the reinforcing pipe can be ground with the center being supported at three points so as to ensure the machining of the reinforcing pipe in a consistent and a highly precise manner.

The method for forming the linking section is not limited to the above-described resin molding in a mold cavity after making insertion members. Alternatively, the linking section may be formed beforehand in a separate step and subsequently formed insertion members are forced into, or bonded to the linking section to be secured therein. Needless to say, even in this case, the guide capillary of each insertion member must be fitted into the linking section so as to attain proper positioning in the rotational direction of the ferrule. According to another alternative method, the coupling loss that occurs between one or more optical fibers inserted in each insertion member and corresponding optical fibers in a master optical connector ferrule is monitored and after adjusting the positions of the individual optical fibers in each insertion member to ensure that a minimum coupling loss will occur, the insertion member is secured to the linking section either by bonding with an adhesive or molding in a resin.

The accuracy of the pitch between insertion members is also very important for the linking section forming mold shown in FIG. 15, and very precise alignment at the submicron level can be realized by supporting the insertion members on a high-precision V-block or by positioning them with a pitch-determining block cage.

ADVANTAGES OF THE INVENTION

The optical connector ferrule of the present invention has the following advantages.

(1) Since it does not require any guide pin for coupling, the operation of coupling two ferrules can be accomplished very easily as compared with the prior art ferrules.

(2) If triangular optical fiber guide holes are formed in the guide capillary, the optical fibers can be adhered to the ferrule very strongly with the aid of an adhesive. In addition, the outer peripheral surface of the reinforcing pipe can be ground in a consistent manner with the center of machining being supported by three points of the center guide hole.

(3) By grinding the outer peripheral surface of the reinforcing pipe with the center of machining fixed at the center guide hole, all of the optical fiber guide holes can be held in precise position with respect to the outside diameter of the ferrule.

(4) If the flange portion of the ferrule is made in a non-circular form, it can be molded with the relative position of the guide capillary being properly determined with great ease.

(5) If the guide capillary is formed in such a manner that its front end projects beyond the front end of the reinforcing pipe, the end of the ferrule can be easily ground and polished to achieve desired end preparation. If the capillary end is tapered, it can be easily ground and polished to provide a proper cylindrical surface.

(6) Easy insertion of optical fibers can be realized by forming the guide capillary in such a manner that its rear end projects beyond the rear end of the ferrule to provide an area where part of the optical fiber guide grooves is exposed.

(7) If the guide substrate and flat plate of the guide capillary are made of a material such as a plastic that has a smaller Young's modulus than the optical fibers, increased ease is imparted to the operation of grinding and polishing the guide capillary end. In addition, the guide capillary will undergo elastic deformation fairly easily and the chance of two optical fibers of gaining optical contact is sufficiently increased to realize low-loss coupling.

(8) The coupled ferrules are secured in alignment by means of the engagement between the reinforcing pipe of each of the insertion members and a sleeve into which they are closely fitted. As a result, the ferrules can be connected or disconnected with minimum occurrence of wear or damage, thereby ensuring consistent connect/ disconnect characteristics.

(9) The guide capillary can be manufactured at a high production rate by performing continuous machining on wafers of a suitable material such as silicon.

(10) If the guide capillary is formed in such a way that its front end projects beyond an end of the reinforcing pipe, the projecting face of the capillary can be used as a convenient guide for attaining proper positioning in the rotational direction of ferrule when forming the linking section.

(11) By forming a plurality of insertion members varying outside diameters or pitches, the correct direction or orientation of coupling can be readily determined.

What is claimed is:

1. An optical connector ferrule for use in an optical coupling of optical fibers, comprising:
    an insertion member having a guide capillary for positioning said optical fibers, said guide capillary comprising a flat plate and a guide substrate having optical fiber guide grooves in one surface thereof, said flat plate being bounded to said guide substrate so as to form optical fiber guide holes into which said optical fibers are inserted;
    a reinforcing pipe for surrounding said guide capillary;
    a resin material provided in the area between said guide capillary and said reinforcing pipe for insert-molding said guide capillary within said reinforcing pipe; and
    a flange member having a non-circular cross section, said flange member being provided at one end of said insertion member so that said optical angle fiber guide holes are positioned at a predetermined angle with respect to said flange member.

2. An optical connector ferrule as claimed in claim 1, further comprising a linking section for fixedly integrating a plurality of said insertion members into a unitary member.

3. An optical connector ferrule as claimed in claim 2, wherein said optical fiber guide holes in said plurality of guide capillaries are arranged in a direction that is parallel to a direction in which said insertion members are arranged.

4. An optical connector ferrule as claimed in claim 2, wherein said optical fiber guide holes in said plurality of guide capillaries are arranged in a direction that is perpendicular to a direction in which said insertion members are arranged.

5. An optical connector ferrule as claimed in claim 2, wherein at least one of said insertion members has a diameter different from that of the others.

6. An optical connector ferrule as claimed in claim 1, wherein said optical fiber guide grooves are V-shaped.

7. An optical connector ferrule as claimed in claim 1, wherein said insertion member is provided with a center hole at a center thereof.

8. An optical connector ferrule as claimed in claim 7, said center hole is formed by one of said optical fiber guide holes.

9. An optical connector ferrule as claimed in claim 1, wherein said guide capillary is made of a hard and brittle material.

10. An optical connector ferrule as claimed in claim 1, wherein said guide capillary is provided with an exposed area in the rear end thereof where said guide substrate is formed longer than said flat plate to facilitate an insertion of said optical fiber into said optical fiber guide hole.

11. An optical connector ferrule as claimed in claim 10, wherein said exposed area is provided with a step for fixing an optical fiber array.

12. An optical connector ferrule as claimed in claim 1, wherein said guide capillary projects beyond an end of said reinforcing pipe.

13. An optical connector ferrule as claimed in claim 12, wherein the projected portion of said guide capillary is of a tapered shape.

14. An optical connector ferrule as claimed in claim 1, wherein said guide capillary is provided with an optical fiber array guide hole.

15. An optical connector ferrule as claimed in claim 1, wherein the center of said optical fiber guide holes coincides with the center of said guide capillary in the thickness direction of said guide capillary.

16. An optical connector ferrule as claimed in claim 15, wherein said guide capillary has a cylindrical surface with the center of said optical fibers at the front end thereof.

17. An optical connector ferrule as claimed in claim 1, wherein said flange member is formed by said reinforcing pipe.

18. An optical connector ferrule for use in an optical coupling of optical fibers, comprising:
  an insertion member having a guide capillary for positioning said optical fibers, said guide capillary comprising a flat plate and a guide substrate having optical fiber guide grooves in one surface thereof, said flat plate being bounded to said guide substrate so as to form optical fiber guide holes into which said optical fibers are inserted, wherein said guide capillary is made of a material which has a smaller Young's modulus than the glass of said optical fiber;
  a reinforcing pipe for surrounding said guide capillary; and
  a resin material provided in the area between said guide capillary and said reinforcing pipe for insert-molding said guide capillary within said reinforcing pipe.

* * * * *